A. D. HAY.
Dough-Tray.
No. 217,462. Patented July 15, 1879.
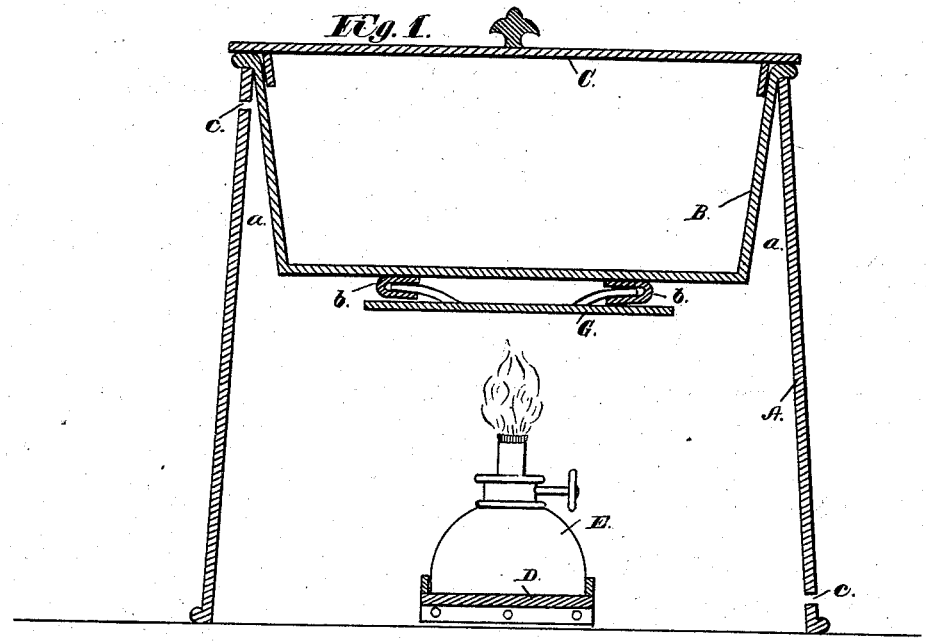
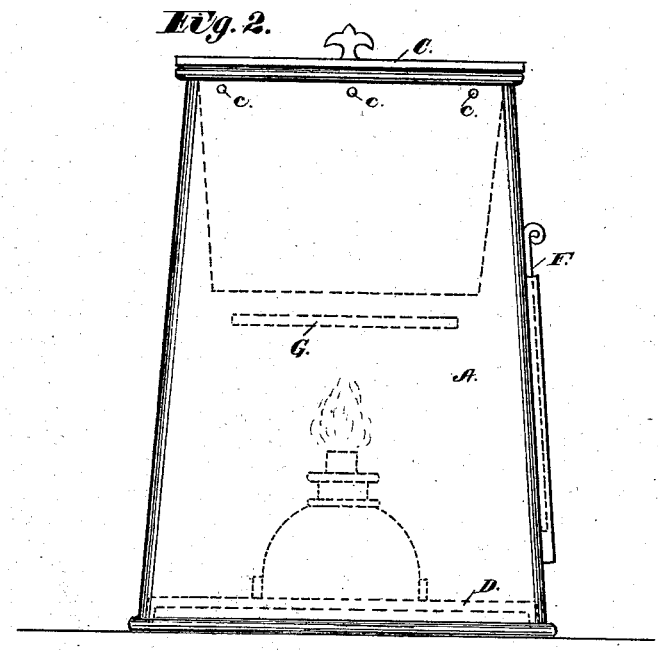
Witnesses:
Chas. M. Peck
Wm Ritchie
Inventor:
Abraham D. Hay
by Peck & Ritchie
his Attys.

UNITED STATES PATENT OFFICE.

ABRAHAM D. HAY, OF NEW LEBANON, OHIO.

IMPROVEMENT IN DOUGH-TRAYS.

Specification forming part of Letters Patent No. 217,462, dated July 15, 1879; application filed March 13, 1879.

*To all whom it may concern:*

Be it known that I, ABRAHAM D. HAY, of New Lebanon, in the county of Montgomery and State of Ohio, have invented certain new and useful Improvements in Dough-Trays; and I do hereby declare the following to be a full, clear, and exact description of the same.

My invention relates to that class of dough-raisers in which the tray is subjected to the heat of a lamp or furnace in an inclosed case or chamber, for the purpose of evenly and thoroughly warming the dough to cause it to rise uniformly.

My improved device consists, essentially, of a sheet-metal case or chamber, open at the top to receive and sustain the dough-tray, and containing a lamp or gas-burner to supply the requisite amount of heat. The chamber is provided with a door, by which access is had to its interior, and it has air-vents near its top and bottom to furnish sufficient air for the combustion of the flame. The bottom of the tray is provided with a detachable shield, which, being located over the flame, prevents its direct heat from striking upon the bottom of the tray, and at the same time it is placed near enough to the bottom of the tray to radiate heat thereon and not cut it off entirely from that portion of the tray directly over the shield.

The novelty consists in the general construction, combination, and arrangement of the parts composing the device, as will be herewith set forth and specifically claimed.

In the accompanying drawings, Figure 1 is a longitudinal central sectional view of my improved device in elevation. Fig. 2 is an end view of the same.

A is a sheet-metal chamber or box, open at its top and having its sides slightly convergent from its bottom upward. Into this chamber is put the metal dough-tray B, of ordinary or any suitable construction, with its flanged top resting on the top edges of the chamber or box A, as seen in Fig. 1. Thus the mouth of the chamber is entirely closed by the tray, and the latter is inclosed by the chamber, with a space, $a$, between their respective sides, as illustrated. The mouth of the tray may be provided with a cover, C, as shown.

In the bottom of the chamber is a central platform, D, whereon any suitable lamp, E, is placed, so as to be situated directly under the center of the tray. This lamp is placed in the chamber, and access may be had to regulate it through a door, F, of any ordinary construction, in one side of the chamber, Fig. 2.

Upon the bottom of the tray are two slides, $b$, into which the ends of a metal shield, G, are slipped to hold it in place. This shield is parallel to the bottom of the tray, and at some little distance from it, so as to form an air-space between the two, and is located centrally with relation to the bottom of the tray, so as to be over the flame of the lamp.

Near the top and bottom of the sides of the chamber are apertures $c$, to permit the circulation of sufficient air to insure the combustion of the lamp.

Instead of these plain apertures, registers may be used to regulate the amount of air admitted.

It can be readily understood that instead of a lamp, a gas-burner with proper connections can be employed when desired.

My device operates as follows: The dough is put in the tray and covered. The tray is then placed in the chamber, as above described, and the gas or lamp is lighted and the intensity of the flame is regulated, as before described. The heat of the flame striking upon the shield is dispersed and passes up into the space $a$, surrounding the tray, and is furthermore radiated from the shield upon the bottom of the tray, and thus the latter is entirely and uniformly heated, and the dough is thoroughly raised.

I am aware that it is not new to subject a dough-tray to the heat of a lamp or furnace in an inclosed chamber, and consequently do not claim the principle involved.

Having thus described my invention, I claim as follows:

The combination, with a dough-tray surrounded by a heating-chamber provided with a lamp or gas-burner and air-vents $c$, of a detachable shield applied to the bottom of said tray, with an air-space between the two, substantially as and for the purpose specified.

Witness my hand this 15th day of January, A. D. 1879.

ABRAHAM D. HAY.

Witnesses:
PATRICK H. GUNCKEL,
WM. RITCHIE.